United States Patent [19]
Persson et al.

[11] Patent Number: 6,152,526
[45] Date of Patent: Nov. 28, 2000

[54] VEHICLE SEAT HAVING BACK REINFORCED AGAINST FORWARD MOVEMENT

[75] Inventors: Dan Persson, Alingsäs; Martin Lindström, Stenkullen, both of Sweden

[73] Assignee: Autoliv Develpoment AB, Vårgårda, Sweden

[21] Appl. No.: 09/319,954

[22] PCT Filed: Dec. 8, 1997

[86] PCT No.: PCT/SE97/02041

§ 371 Date: Sep. 15, 1999

§ 102(e) Date: Sep. 15, 1999

[87] PCT Pub. No.: WO98/25790

PCT Pub. Date: Jun. 18, 1998

[30] Foreign Application Priority Data

Dec. 13, 1996 [GB] United Kingdom .................. 9625998

[51] Int. Cl.[7] ...................................................... B60N 2/42
[52] U.S. Cl. .................................. 297/216.13; 297/216.1
[58] Field of Search .................................. 297/464, 468, 297/470, 473, 474, 483, 216.1, 216.13

[56] References Cited

U.S. PATENT DOCUMENTS

| 3,957,304 | 5/1976 | Koutsky et al. . |
|---|---|---|
| 5,015,010 | 5/1991 | Homeier et al. . |
| 5,020,856 | 6/1991 | George . |
| 5,439,272 | 8/1995 | Hallet et al. . |
| 5,533,775 | 7/1996 | Cyliax . |
| 5,642,916 | 7/1997 | Dybro et al. . |

FOREIGN PATENT DOCUMENTS 38 13 557   2/1989   Germany .

*Primary Examiner*—Milton Nelson, Jr.
*Attorney, Agent, or Firm*—Venable; George H. Spencer; Robert Kinberg

[57] ABSTRACT

A seat for a motor vehicle has a squab (1) and a back (8). The back of the seat is provided with a framework (12) for supporting a guide means or retractor (13) for a safety belt (10) located adjacent the top of the back of the seat. The framework (12) is reinforced to prevent inadvertent forward movement of the top part of the back of the seat by means of an elongate substantially inextensible clement (14), one end of which is secured to an upper part of the framework (12) and the other end of which is secured in position (17). The elongate element is configured so that if the top part of the back (8) of the seat tends to move forwardly a tension is imparted to the inextensible elongate element (14), the elongate element thus acting substantially to prevent forward movement of the upper part of the back (8) of the scat.

6 Claims, 4 Drawing Sheets

VEHICLE SEAT HAVING BACK REINFORCED AGAINST FORWARD MOVEMENT

THE PRESENT INVENTION relates to a vehicle seat, and more particularly relates to a vehicle seat intended for use in a passenger vehicle such as a motor car.

It has been proposed, in motor vehicles of this type, to provide a safety-belt in order to retain an occupant of a seat in position in the seat should an accident arise. Such a safety-belt may be associated with a retractor. The retractor may be mounted on the floor of the vehicle and the safety-belt may pass through a guide loop provided at the top of the seat adjacent the shoulder of an occupant of the seat. Alternatively, the retractor mechanism itself may be mounted on the back of the seat at a position adjacent the shoulder of the seat. If either of these expedients is adopted, in the event that an accident arises which causes the vehicle to decelerate, the retractor mechanism locks thus preventing the safety-belt being withdrawn from the retractor. As the vehicle decelerates, the occupant of the seat may tend to move forwardly relative to the seat and is restrained by the safety-belt. However, a very substantial force may be applied to the safety-belt. This force is transferred to the top part of the back of the safety-belt where the guide loop or where the retractor is located.

It is thus to be understood that in an arrangement of this type, it has been proposed previously to make the of the seat relatively sturdy or strong so that the back of the seat is able to withstand the forces applied to it. However, this has the disadvantage that the back of the seat is then very heavy and also the back of the seat is expensive to construct. Designs of this particular type are exemplified by EP-A-0,646,493 and DE-A-4,330,011.

There is a need to reduce the overall weight of a vehicle seat of this type, in order to improve vehicle efficiency and also there is a need to reduce the cost of a vehicle seat of this type. The present invention of withstanding a substantial load, and which is relatively light and relatively inexpensive.

According to this invention there is provided a seat for a motor vehicle, the seat being provided with a squab and a back, the back of the seat being provided, at a point adjacent the top of the back of the seat, with guide means for a safety-belt or a retractor mechanism for a safety-belt, the back of the seat being provided with a framework supporting the guide means or retractor, the framework being reinforced to prevent inadvertent forward movement of the top part of the back of the seat by means of an elongate substantially inextensible element, one end of the elongate inextensible element being secured to an upper part of the framework of the back of the seat, wherein support means are provided which extend rearwardly from the squab of the seat, which guide the elongate element and constrain the elongate element to pass a point located rearwardly of the lower part of the back of the seat, the lower end of the elongate element being connected to means supporting the squab of the seat, the elongate element thus being configured so that if the top part of the back of the seat tends to move forwardly, a tension is imparted to the inextensible elongate element, the inextensible elongate element thus acting substantially to prevent forward movement of the upper part of the back of the seat.

Advantageously the lower end of the elongate element is secured to a carriage which slidably supports the seat.

Preferably the lower end of the wire passes through clamping means mounted on means which support the seat, the clamping means being engageable and disengageable, the back of the seat being connected to the squab of the seat by means of a recliner mechanism to permit adjustment of the back of the seat.

Conveniently resilient means are provided to maintain tension in the wire when the clamping means are released.

Advantageously the said support means are connected to, and extend rearwardly from, the recliner mechanism.

Preferably the framework within the back of the seat is articulated and further support means are provided, associated with such further articulation, to engage the elongate element.

In order that the invention may be more readily understood, and so that further features thereof may be appreciated, the invention will now be described, by way of example, with reference to the accompanying drawings in which.

Figure 1:
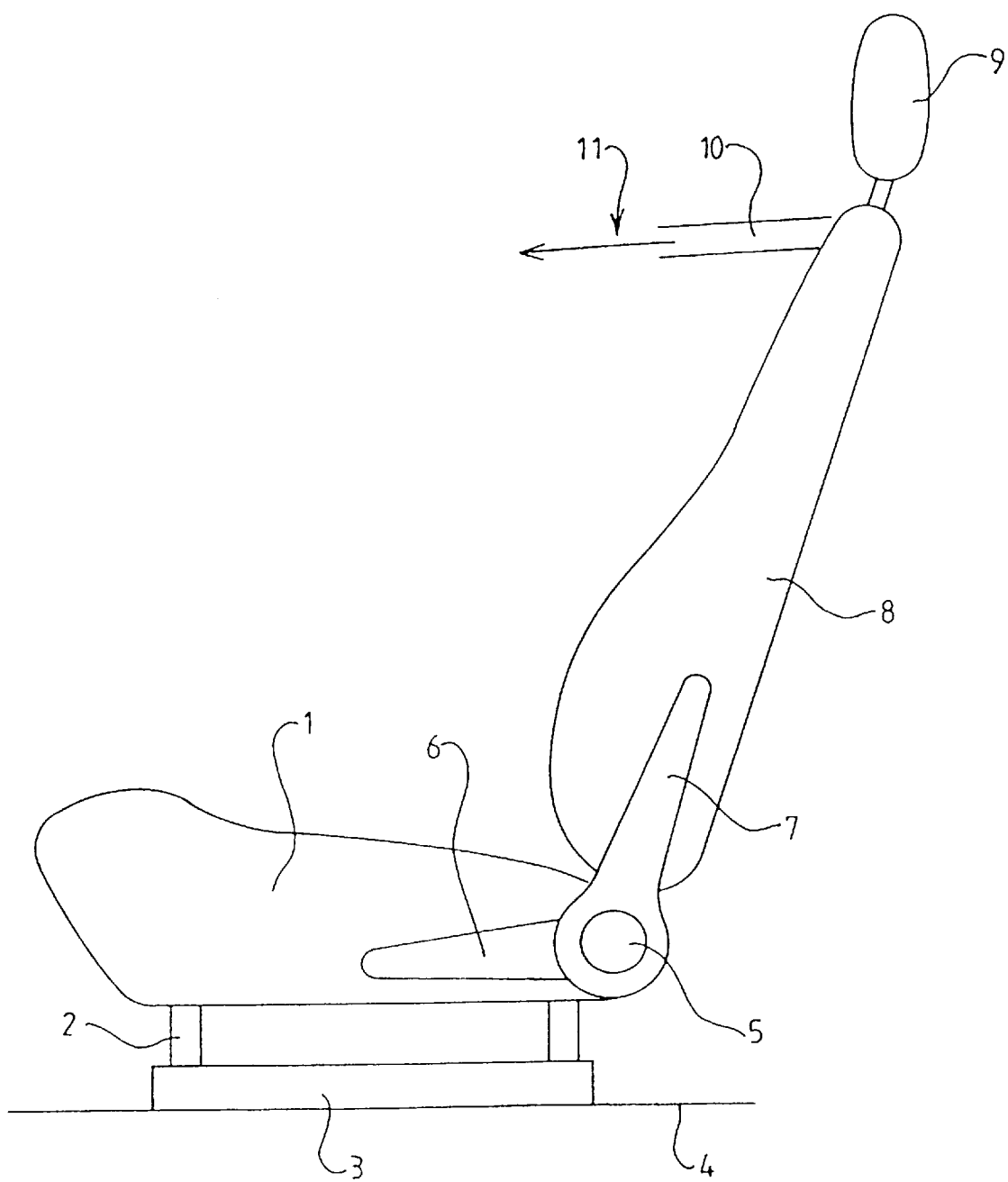
FIG. 1 is a side view of a conventional seat.

Referring initially to FIG. 1 of the accompanying drawings, a vehicle seat comprises a squab 1 which is supported by legs 2, and which is mounted by appropriate mounting means such as a sliding carriage 3 on the floor 4 of a vehicle. The sliding carriage 3 may be such as to permit forward and rearward adjustment of the seat.

A recliner mechanism 5 is provided which is connected to the squab of the seat 1 by means of a connecting arm 6 and which is connected, by means of a second connecting arm 7, to the back 8 of the seat. The recliner mechanism may permit the angle of inclination of the back of the seat 8 relative to the squab 1 to be adjusted.

At the upper end of the back 8 of the seat a head-rest 9 is provided and also a seat-belt 10 is provided which is wound on to a retractor which is located at the top of the back 8 of the seat at a position adjacent a shoulder of an occupant of the seat.

It is to be appreciated that when a seat as illustrated in FIG. 1 is utilised, should an accident occur a substantial force will be applied to the seat-belt 10, in the direction generally indicated by the arrow 11. This force is generated as a consequence of the occupant of the seat moving forward relative to the seat, following deceleration of the vehicle, and an associated deceleration of the seat.

In the embodiments of the invention which will be described hereinafter, an inextensible elongate element, in the form of a cable or wire, is used to provide a required reinforcing which is effective in an accident situation. This enables the framework provided in the back of the seat to be much lighter than the framework provided in the seat illustrated in FIG. 1. In the following drawings, the components of the illustrated seats which correspond directly with components of the seat illustrated in FIG.1 will have the same reference numerals and will not be redescribed in detail.

Figure 2:
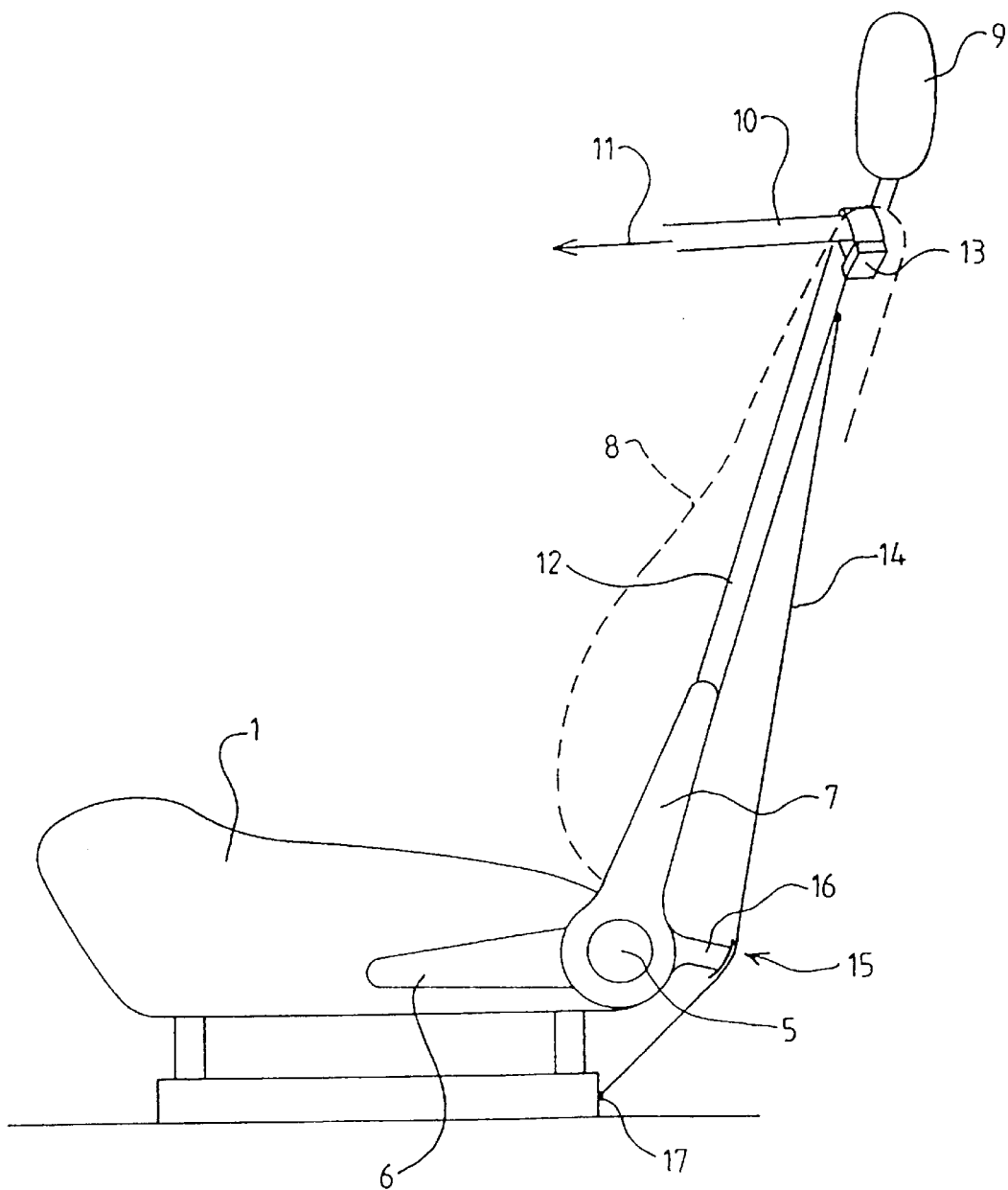
FIG. 2 is a view of a seat in accordance with the present invention with parts thereof cut away for the sake of clarity of illustration.

Referring initially to FIG. 2 of the accompanying drawings, the back 8 of the seat is provided with an inner framework 12 which extends from the connecting arm 7 of the recliner mechanism 5 to an upper part of the back of the seat. The framework 12 supports a retractor mechanism 13 on which the safety-belt 10 is wound. The retractor mechanism 13 is located adjacent the top of the back of the seat.

An inextensible elongate element in the form of a wire or cable 14 is provided. One end of the wire or cable is secured to the inner framework 12 of the back 8 of the seat at a point adjacent the retractor mechanism 13 at the top of the back of the seat. The wire passes downwardly and is supported, at a point 15, at a point which is spaced from the pivot axis of the recliner mechanism 5, by means of a support 16. The lower end of the wire is anchored, at anchor point 17, to the carriage 3 of the seat.

It will be understood that in the event that an accident arises, and a substantial force is applied, in the general direction of the arrow 11, to the safety-belt 10, and thus to the retractor mechanism 13, the top part of the back of the seat 8 will tend to move forwardly. However, this forward movement of the top part of the back of the seat will apply a tension to the wire or cable 14. Because the wire or cable 14 is substantially inextensible, the wire or cable 14 effectively prevents the top part of the back of the seat from moving forwardly.

It is to be appreciated that in the embodiment illustrated in FIG. 2, the lower end of the wire 17 has been fixed to the carriage 3 which supports the seat. This forms an ideal anchoring point for the lower end of the wire since this particular component must be made to be relatively strong to support the seat. However, this arrangement precludes the adjustment of the position of the back of the seat with the recliner mechanism 5. In an alternative embodiment the lower end of the wire 14 could be secured in position at the point 15 on the support 16. The support 16 would then have to be made to be sufficiently strong to withstand the forces applied to it, but such an arrangement would enable the adjustment of the position of the back of the seat with the recliner mechanism 5.

It is preferred, therefore, to utilise an arrangement in which the support 16 serves to deflect the wire, one end of the wire being mounted in position at the top of the back of the seat, and the lower end of the wire being mounted to a relatively strong element such as the carriage 3 which supports the vehicle seat.

Whilst the embodiment illustrated in FIG. 2 will operate in a satisfactory manner, it will be understood that with an embodiment of this type it is not possible to adjust the relative position of the back of the seat using the recliner mechanism.

Figure 3:
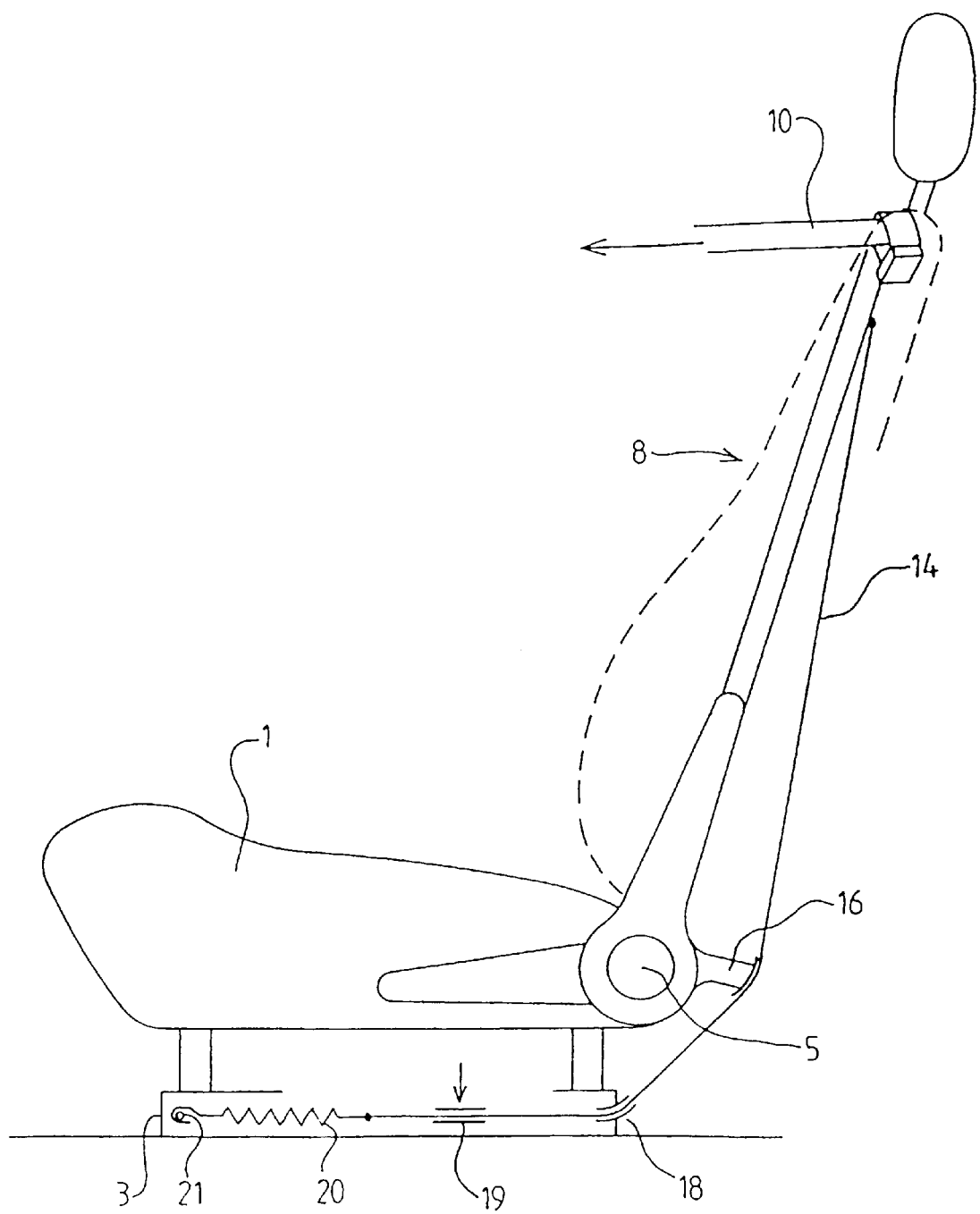
FIG. 3 is a view corresponding to FIG. 2 illustrating a second embodiment of the invention.

Referring now to FIG. 3, it can be seen that in this embodiment of the invention, the seat shown in FIG. 2 has been modified in that the lower end of the wire 14, after it has passed to the support 16, is led through a guide 18 and thus through a clamping mechanism 19. The end of the wire 14 is connected to a spring or other resilient element 20 which in turn is connected to an anchor point 21 mounted on the carriage 3 which supports the seat.

It is to be appreciated, therefore, that in the embodiment of FIG. 3, the position of the back of the seat may be adjusted. The clamping mechanism 19 may be released, and the recliner mechanism 6 may be actuated to adjust the angle of inclination of the back of the seat. As this operation is carried out, the spring 20 will maintain tension in the wire 14, but if the back of the seat is pivoted forwardly, wire will be pulled out through the clamping mechanism 19 and the guide 18, whereas if the back of the seat is pivoted rearwardly, wire will be drawn in through the clamping mechanism 19 and the guide 18.

When the adjustment of the back of the seat has been finalised, the clamp 19 will be engaged in order firmly to grip the portion of the wire 14 contained within the clamping mechanism, thus firmly anchoring that part of the wire to the carriage 3. Thus, again, in such an embodiment, the wire 14 will prevent the top part of the back 8 of the seat from moving forwardly when a force is applied to the seat-belt 10.

Figure 4:
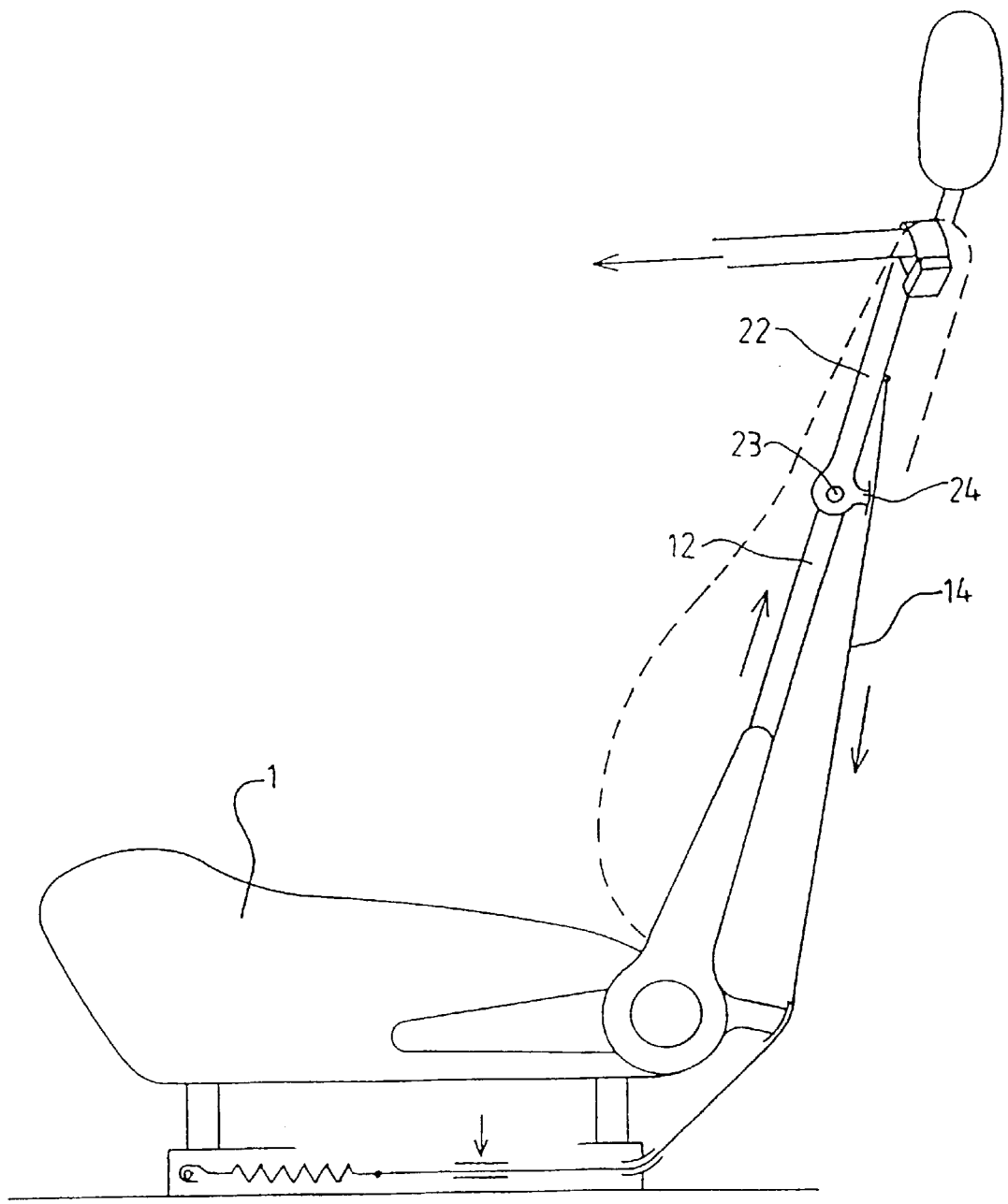
FIG. 4 is a view corresponding to FIGS. 2 and 3 illustrating a third embodiment of the invention.

FIG. 4 illustrates a further embodiment of the seat in which the reinforcing frame 12 within the back of the seat is provided with an upper part 22 which can pivot forwardly about a pivot axis 23. It can be seen that the wire 14 passes a support 24 associated with the pivot 23 which corresponds generally with the support 16, and which serves to deflect the wire away from the pivot axis. Thus the support means serve to deflect the wire so that the wire is guided to pass a point which is spaced away from the pivot axis.

Whilst the invention has been described with reference to three specific embodiments, it is to be appreciated that many modifications may be effected without departing from the scope of the invention as defined by the following claims. In particular, in the described embodiments, a retractor mechanism is provided at the top of the seat. In alternative embodiments of the invention, the retractor mechanism may itself be located adjacent the base of the seat, and a belt guide may be provided adjacent the top of the seat in order to guide the belt.

What is claimed is:

1. A seat for a motor vehicle, the seat being provided with a squab and a back, the back of the seat being provided, at a point adjacent the top of the back of the seat, with one of a) guide means for a safety-belt and b) a retractor mechanism for a safety-belt, the back of the seat being provided with a framework supporting said one of the guide means and the retractor, the framework being reinforced to prevent inadvertent forward movement of the top part of the back of the seat by means of an elongate substantially inextensible element, one end of the elongate inextensible element being secured to an upper part of the framework of the back of the seat, wherein support means is provided which extend rearwardly from the squab of the seat and which guides the elongate element and constrains the elongate element to pass a point located rearwardly of the lower part of the back of the seat, the other end of the elongate element being connected to means supporting the squab of the seat, the elongate element thus being configured so that if the top part of the back of the seat tends to move forwardly, a tension is imparted to the inextensible elongate element, the inextensible elongate element thus acting substantially to prevent forward movement of the upper part of the back of the seat.

2. A seat according to claim 1 wherein said other end of the elongate element is secured to a carriage which slidably supports the seat.

3. A seat according to claim 1 wherein said other end of the elongate inextensible element passes through clamping means mounted on means which support the seat, the clamping means being engageable and disengageable with the elongate inextensible element, the back of the seat being connected to the squab of the seat by means of a recliner mechanism to permit adjustment of the back of the seat.

4. A seat according to claim 3 wherein resilient means is provided to maintain tension in the elongate inextensible element when the clamping means are released.

5. A seat according to claim 1 wherein the back of the seat is connected to the squab of the seat by means of a recliner mechanism to permit adjustment of the back of the seat, and said support means is connected to, and extends rearwardly from, the recliner mechanism.

6. A seat according to claim 1 wherein the framework within the back of the seat is articulated and further support means is provided, associated with such further articulation, to engage the elongate element.

* * * * *